(12) United States Patent
Koike et al.

(10) Patent No.: US 11,880,589 B2
(45) Date of Patent: Jan. 23, 2024

(54) STORAGE SYSTEM AND CONTROL METHOD

(71) Applicant: Hitachi, Ltd., Tokyo (JP)

(72) Inventors: Junji Koike, Tokyo (JP); Hirotaka Nakagawa, Tokyo (JP); Kodai Nozawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 103 days.

(21) Appl. No.: 17/691,158

(22) Filed: Mar. 10, 2022

(65) Prior Publication Data

US 2022/0405010 A1    Dec. 22, 2022

(30) Foreign Application Priority Data

Jun. 18, 2021   (JP) ................................ 2021-101785

(51) Int. Cl.
*G06F 12/00* (2006.01)
*G06F 3/06* (2006.01)

(52) U.S. Cl.
CPC .......... *G06F 3/0655* (2013.01); *G06F 3/0604* (2013.01); *G06F 3/0631* (2013.01); *G06F 3/0679* (2013.01)

(58) Field of Classification Search
CPC .... G06F 3/0655; G06F 3/0604; G06F 3/0631; G06F 3/0679; G06F 3/0685
See application file for complete search history.

(56) References Cited

U.S. PATENT DOCUMENTS

2014/0351319 A1\* 11/2014 Lee ....................... G06F 9/5072
                                                          709/203
2017/0277443 A1    9/2017 Deguchi et al.

FOREIGN PATENT DOCUMENTS

JP            6317524 B2    4/2018

\* cited by examiner

*Primary Examiner* — John A Lane
(74) *Attorney, Agent, or Firm* — Mattingly & Malur, PC

(57) ABSTRACT

A storage system is coupled to a cloud system that provides cloud volumes belonging to any of a plurality of tiers with different access performances. The cloud system changes a tier to which an externally-provided volume belongs based on a state of volume utilization in which the cloud volumes are utilized. A storage controller of the storage system provides a host computer with a volume created by allocating a page to an external volume that corresponds to the cloud volumes. In addition, the storage controller adjusts a state of volume utilization to control a tier to which the cloud volumes belong.

9 Claims, 21 Drawing Sheets

FIG. 6

| 1611 | 1612 | 1613 | 1614 | 1615 | 1616 |
|---|---|---|---|---|---|
| VOL ID | Capacity (GB) | Free capacity (GB) | TYPE | Affiliated storage medium | Allocation destination |
| 0000 | 200 | 100 | DP-VVOL | POOL1 | WWN1 |
| 0010 | 1000 | 500 | NORMAL | SSD | POOL1 |
| E001 | 500 | 200 | EXTERNAL | EXTERNAL | POOL1 |
| E002 | 500 | 100 | EXTERNAL | EXTERNAL | POOL1 |

161 Volume management table

FIG. 7

| VOL ID (1621) | Capacity (GB) (1622) | EXTERNAL PORT ID (1623) | EXTERNAL GROUP ID (1624) |
|---|---|---|---|
| E001 | 500 | 1-A | E1-1 |
| E002 | 500 | 1-B | E2-1 |

| Coupling destination VOL ID (1625) | Coupling destination apparatus ID (1626) | Coupling destination affiliated tier (1627) | External volume performance (1628) |
|---|---|---|---|
| CLOUD_A_001 | CLOUD_A | HOT | 14 IOPS |
| CLOUD_A_002 | CLOUD_A | COLD | 1 IOPS |

162 External volume management table

FIG. 8

| 1631 | 1632 | 1633 | 1634 | 1635 | 1636 |
|---|---|---|---|---|---|
| POOL ID | Virtual capacity (GB) | Actual capacity (GB) | TYPE | T1 capacity (GB) | T1 allocated VOL ID |
| POOL1 | 4000 | 2000 | DT | 1000 | 0010 |

| 1635 | 1636 | 1635 | 1636 |
|---|---|---|---|
| T2 capacity (GB) | T2 allocated VOL ID | T3 capacity (GB) | T3 allocated VOL ID |
| 500 | E001 | 500GB | E002 |

163 Storage pool management table

FIG. 9

| Apparatus ID | Management port | Tier information | I/O performance requirement ||
|---|---|---|---|---|
| | | | IO PATTERN | IOPS |
| CLOUD_A | 10.11.1.204 | HOT | RANDOM READ/WRITE | 14 IOPS |
| | | COLD | ANY | 2 IOPS |

1641 / 1642 / 1643 / 1644A / 1644 / 1644B

164 Externally-coupled apparatus management table

FIG. 10

| 1651 | 1652 | 1653 | 1654 | 1655 | 1656 | 1657 |
|---|---|---|---|---|---|---|
| VOL ID | I/O PATTERN | IOPS | Target area | I/O Issuance date/time | Repetition interval | Status |
| E001 | RANDOM READ/WRITE | 14 IOPS | LBA0001-002F | 2021/04/01 23:00:00 | 1 day | WARNING |
| E002 | ANY | 2 IOPS | LBA0001-002F | 2021/04/01 23:00:00 | 1 day | NORMAL |

165 Schedule management table

FIG. 11

| Entry # | Migration source tier | Migration destination tier | Migration capacity | Free capacity |
|---|---|---|---|---|
| 1 | 2 | 3 | 200 GB | 100 GB |
| 2 | 3 | 2 | 300 GB | 200 GB |

166 Page migration capacity management table

FIG. 15

List of external volumes utilizing cloud — 1500

| # | External volume | Pool allocated tier | Coupling destination affiliated tier | Status | Error message |
|---|---|---|---|---|---|
| 1 | Ext-Vol 0 | T2 | HOT | NORMAL | |
| 2 | Ext-Vol 1 | T2 | COLD | ⚠ WARNING | Performance degradation may occur in DP-Vol in use. A change to pool tier configuration is necessary. |
| 3 | Ext-Vol 2 | T3 | COLD | NORMAL | |

List of pool tiers utilizing cloud — 2000

| # | Pool | Tier | Total capacity | Free capacity | Migration capacity | Status | Message |
|---|------|------|----------------|---------------|--------------------|--------|---------|
| 1 | HDT-Pool 0 | Tier 2 | 1 TB | 100 GB | 200 GB | ⚠ WARNING | Although tier configuration has been changed based on cloud-side tier information, page cannot be migrated due to insufficient free capacity. Since performance degradation may occur, a pool volume needs to be added. |
| 2 | HDT-Pool 0 | Tier 3 | 2 TB | 1 TB | 300 GB | NORMAL | |
| | 2001 | 2002 | 2003 | 2004 | 2005 | 2006 | 2007 |

List of pool tiers utilizing cloud — 2100

| # | Pool | Tier | Total capacity | Free capacity | Migration capacity | Status | Message |
|---|------|------|----------------|---------------|--------------------|--------|---------|
| 1 | HDT-Pool 0 | Tier 2 | 2 TB | 1 TB | 300 GB | NORMAL | |
| 2 | HDT-Pool 0 | Tier 3 | 1 TB | 100 GB | 200 GB | ⚠ NOTICE | Although tier configuration has been changed based on cloud-side tier information, page cannot be migrated due to insufficient free capacity. |
| | 2101 | 2102 | 2103 | 2104 | 2105 | 2106 | 2107 |

[ OK ]

STORAGE SYSTEM AND CONTROL METHOD

CROSS-REFERENCE TO RELATED APPLICATION

The present application claims priority from Japanese application JP 2021-101785, filed on Jun. 18, 2021, the contents of which is hereby incorporated by reference into this application.

The present disclosure relates to a storage system and a control method.

BACKGROUND

In a storage system equipped with a plurality of types of storage apparatuses of which access performances differ from each other, tier control may be performed in which storage areas of storage apparatuses of a same type are managed as a single tier and, in accordance with a state of utilization of data stored in the storage apparatuses, a tier to store the data is controlled.

Japanese Patent No. 6317524 discloses a storage system that uses a set of storage areas of external storage apparatuses arranged on a cloud system as a single tier. The storage system is arranged in an on-premise environment such as a data center of a customer and respectively manages, as different tiers, a storage area of an internal storage apparatus arranged inside the on-premise environment and a storage area of the external storage apparatuses arranged on the cloud system, and data with high access frequency is stored in the internal storage apparatus while data with low access frequency is stored in the external storage apparatuses. Accordingly, high access performance of an internal storage apparatus of the on-premise environment can be utilized while conserving capacity of the internal storage apparatus.

SUMMARY

In a cloud system, automatic tier control may be performed in which a tier to store data is controlled independently of a storage system that utilizes the cloud system. For example, when access frequency with respect to data stored in a storage apparatus with high access performance such as an SSD (Solid State Drive) declines, the cloud system performing automatic tier control migrates the data to an inexpensive but high-capacity storage apparatus.

In the storage system described in Japanese Patent No. 6317524, when automatic tier control is performed on a cloud system side, access performance of a storage apparatus storing data may fluctuate and prevent service quality guaranteed by the storage system from being maintained.

An object of the present disclosure is to provide a storage system and a control method capable of maintaining desired service quality even when automatic tier control with respect to an external storage apparatus is performed.

A storage system according to an aspect of the present disclosure is a storage system coupled to an external storage system that provides an externally-provided volume belonging to any of a plurality of tiers with different access performances, the external storage system changing a tier to which the externally-provided volume belongs based on a state of utilization of the externally-provided volume, the storage system including a control unit which provides a host with a volume created by allocating a page to an external volume associated with the externally-provided volume and which controls the tier to which the externally-provided volume belongs by adjusting the state of utilization.

According to the present invention, desired service quality can be maintained even when automatic tier control with respect to an external storage apparatus is performed.

BRIEF DESCRIPTION OF THE DRAWINGS

FIG. 6 is a diagram showing an example of a volume management table;

FIG. 7 is a diagram showing an example of an external volume management table;

FIG. 8 is a diagram showing an example of a storage pool management table;

FIG. 9 is a diagram showing an example of an externally-coupled apparatus management table;

FIG. 10 is a diagram showing an example of a schedule management table;

FIG. 11 is a diagram showing an example of a page migration capacity management table;

FIG. 15 is a diagram showing an example of a warning message screen;

FIG. 20 is a diagram showing another example of the warning message screen; and

FIG. 21 is a diagram showing another example of the warning message screen.

DETAILED DESCRIPTION OF THE EMBODIMENT

Hereinafter, an embodiment of the present disclosure will be described with reference to the drawings.

Figure 1:
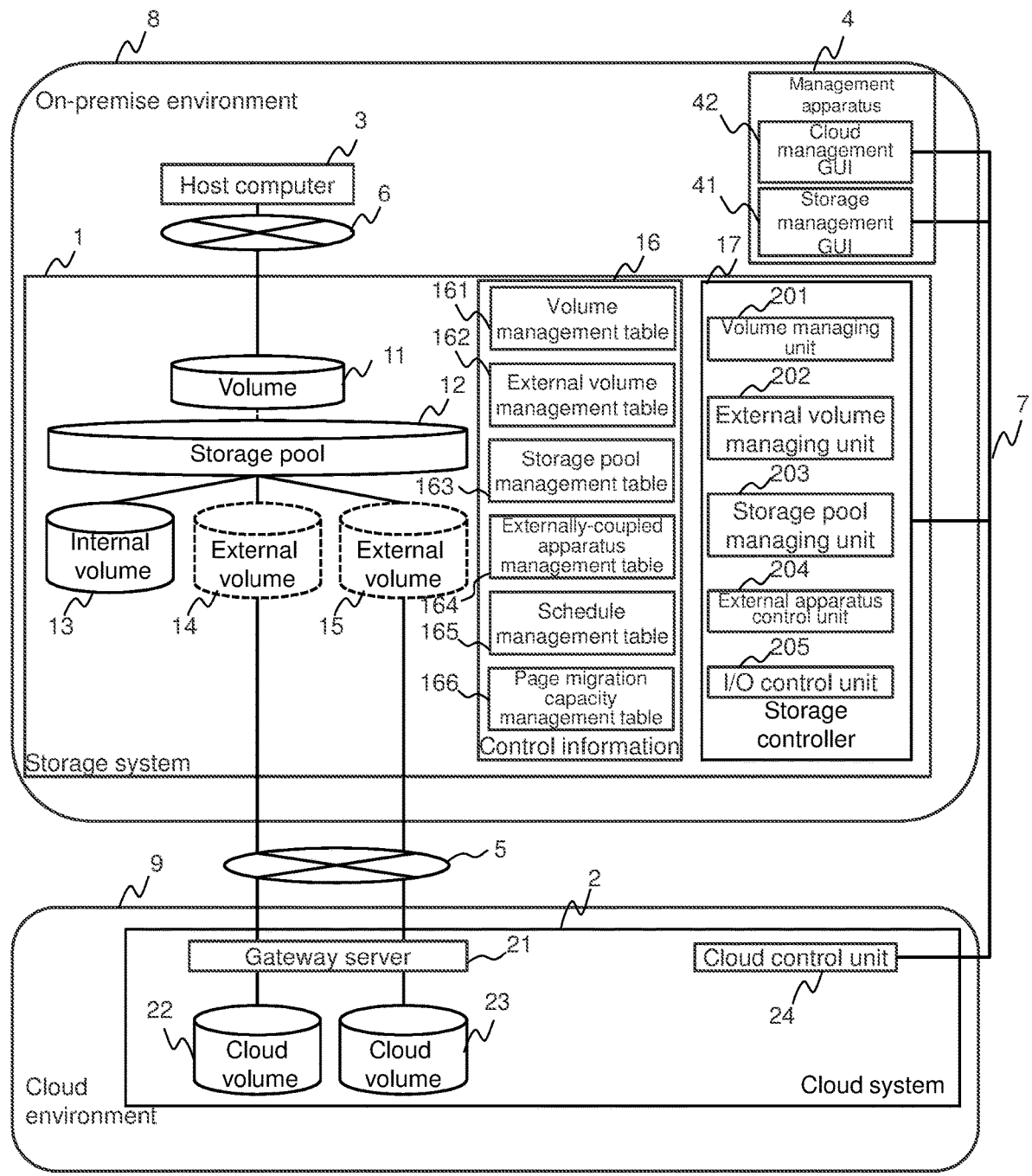
FIG. 1 is a diagram showing a computer system according to an embodiment of the present disclosure.

FIG. 1 is a diagram showing a computer system according to an embodiment of the present disclosure. The computer system shown in FIG. 1 has a storage system 1, a cloud system 2, a host computer 3, and a management apparatus 4. The storage system 1 and the cloud system 2 can be coupled to each other via a storage network 5 and the storage system 1 and the host computer 3 can be coupled to each other via a storage network 6. In addition, the management apparatus 4 can be respectively coupled to the storage system 1 and the cloud system 2 via a management network 7. While the storage networks 5 and 6 are SANs (Storage Area Networks) constructed with an iSCSI (Internet Small Computer System Interface) in the present embodiment, alternatively, the storage networks 5 and 6 may be other networks. In addition, while the management network 7 is the Ethernet (registered trademark) in the present embodiment, alternatively, the management network 7 may be another network.

The storage system 1, the host computer 3, and the management apparatus 4 are arranged in an on-premise environment 8 such as a data center of a customer to whom the storage system 1 provides services while the cloud system 2 is arranged in a cloud environment 9 provided at a separate location from the on-premise environment.

The storage system 1 controls read and write of data in response to an I/O request (a read request and a write request) that is an access request from the host computer 3. The storage system 1 has a volume 11, a storage pool 12, an internal volume 13, external volumes 14 and 15, control information 16, and a storage controller 17.

The volume 11 is a virtual volume which is provided to the host computer 3 and which is segmented from the storage pool 12. The storage pool 12 refers to the whole of pool volumes that can be provided as the volume 11 and, in the present embodiment, the internal volume 13 and the external volumes 14 and 15 are available as pool volumes. The internal volume 13 is a volume allocated to a storage area of an SSD 101 (refer to FIGS. 3 and 4) that is an internal storage apparatus provided inside the storage system 1. The external volumes 14 and 15 are associated with cloud volumes 22 and 23 to be described later.

The storage pool 12 has, as tiers, a plurality of types of volumes of which access performances (for example, read speeds and write speeds) differ from one another (more specifically, a plurality of types of volumes which correspond to respective storage areas of a plurality of types of storage apparatuses of which access performances differ from one another). In the present embodiment, the storage pool 12 has three tiers "Tier 1", "Tier 2", and "Tier 3" in a descending order of access performances. The internal volume 13 and the external volumes 14 and 15 belong to different tiers. In addition, the external volumes 14 and 15 may belong to a same tier or to different tiers. Specifically, the internal volume 13 belongs to "Tier 1" and the external volumes 14 and 15 respectively belong to either "Tier 2" or "Tier 3".

The control information 16 is information for controlling the storage system 1 and includes a volume management table 161, an external volume management table 162, a storage pool management table 163, an externally-coupled apparatus management table 164, a schedule management table 165, and a page migration capacity management table 166. Detailed descriptions of the respective tables 161 to 166 will be provided later (refer to FIGS. 5 to 11).

The storage controller 17 is a control unit that controls the storage system 1. For example, the storage controller 17 loads a program (to be described later) and executes the loaded program to realize a volume managing unit 201, an external volume managing unit 202, a storage pool managing unit 203, an external apparatus control unit 204, and an I/O control unit 205.

The cloud system 2 is a service which is provided on a network such as a wide-area communication network and which provides a user with a storage resource (for example, a logical volume) via the network. The cloud system 2 has a gateway server 21, cloud volumes 22 and 23, and a cloud control unit 24.

The gateway server 21 communicates with the storage system 1. The cloud volumes 22 and 23 are volumes to be provided to the storage system 1 and are allocated to a storage area of a cloud storage apparatus 26 (FIG. 4) to be described later. The cloud storage apparatus 26 includes a plurality of types of storage apparatuses of which access performances differ from one another.

The cloud control unit 24 controls the cloud system 2. For example, the cloud control unit 24 performs automatic tier control of the cloud system 2. Automatic tier control is control for changing tiers of the cloud volumes 22 and 23 by rearranging data among cloud storage apparatuses 26 of different types in accordance with a state of volume utilization that refers to a state of utilization of the cloud volumes 22 and 23.

In the present embodiment, the cloud system 2 has two tiers "HOT" and "COLD" in a descending order of access performances, and the cloud control unit 24 changes tiers of the cloud volumes 22 and 23 based on the state of utilization of the cloud volumes 22 and 23 and a utilization requirement that refers to a predetermined condition. For example, when the state of utilization with respect to a HOT cloud volume does not satisfy the utilization requirement, the cloud control unit 24 changes the tier of the cloud volume to "COLD".

Hereinafter, in order to differentiate tiers ("Tier 1", "Tier 2", and "Tier 3") that are managed by the storage system 1 from tiers ("HOT" and "COLD") that are managed by the cloud system 2, the tiers managed by the storage system 1 may be referred to as internal tiers and the tiers managed by the cloud system 2 may be referred to as external tiers. In addition, the storage system 1 manages the internal tier "Tier 2" as a tier of which an access performance is identical or similar to that of the external tier "HOT" and manages the internal tier "Tier 3" as a tier of which an access performance is identical or similar to that of the external tier "COLD". Therefore, for example, when an external tier of the cloud volumes 22 and 23 is changed from "HOT" to "COLD" in the cloud system 2, the external volumes 14 and 15 that correspond to the changed cloud volumes 22 and 23 no longer satisfy an access performance that is required as the internal tier "Tier 2".

The host computer 3 is a terminal apparatus that issues an I/O request to the storage system 1.

The management apparatus 4 is a terminal apparatus that is used by a storage manager who manages the storage system 1 and has a storage management GUI (Graphical User Interface) 41 and a cloud management GUI 42. The storage management GUI 41 is a GUI for managing the storage system 1 and the cloud management GUI 42 is a GUI for managing the cloud system 2.

Figure 2:
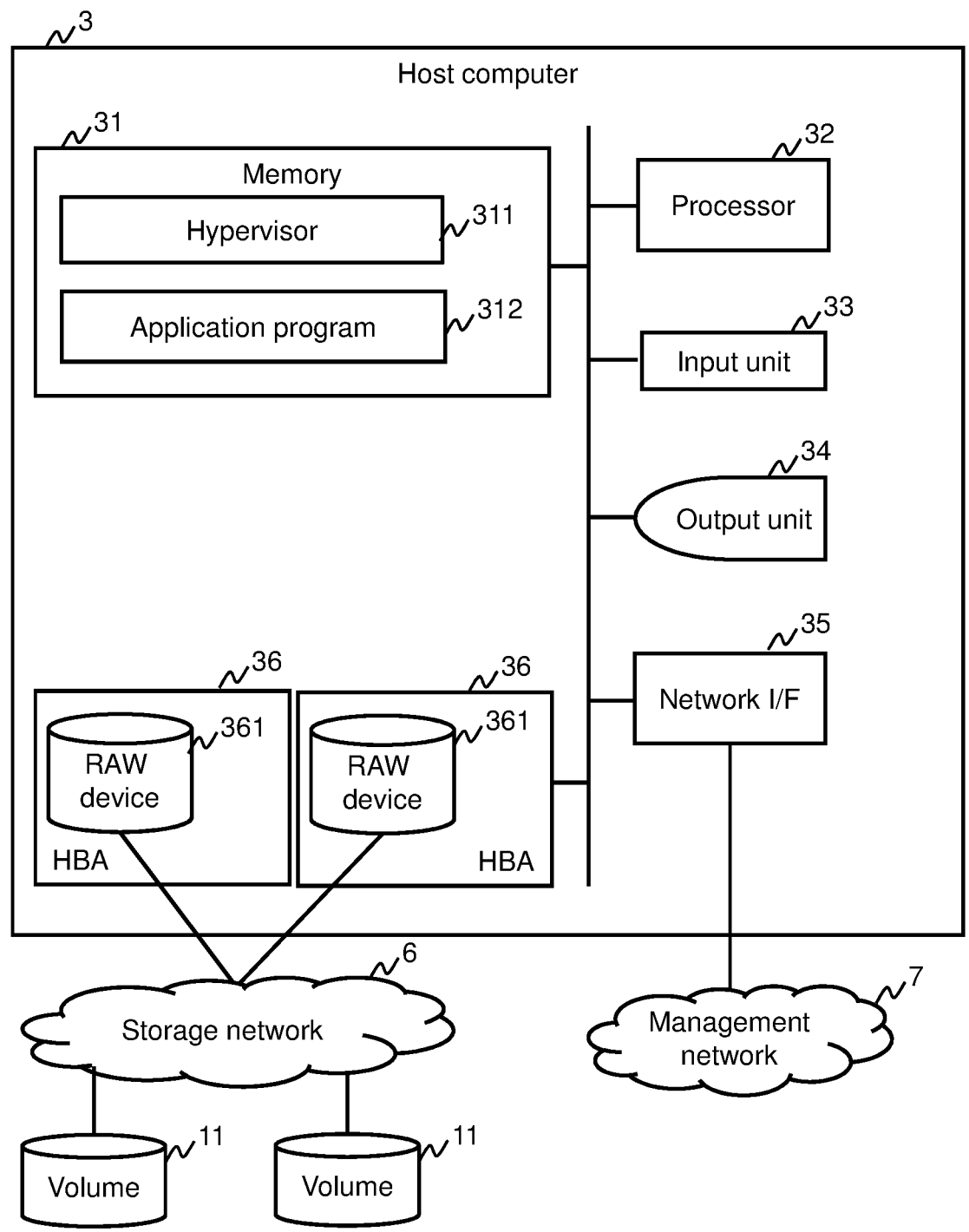
FIG. 2 is a diagram showing an example of a configuration of a host computer.

FIG. 2 is a diagram showing an example of a configuration of the host computer 3. The host computer 3 shown in FIG. 2 has a memory 31, a processor 32, an input unit 33, an output unit 34, a network I/F 35, and an HBA (Host Bus Adapter) 36.

The memory 31 is a recording apparatus for recording data that can be written and read and, for example, the memory 31 records a hypervisor 311 and an application program 312 as programs that define operations of the processor 32. The hypervisor 311 constructs a virtual machine. The application program 312 runs on the virtual machine and, for example, issues an I/O request.

The input unit 33 receives input of various kinds of information from a user of the host computer 3 or the like. Information input to the input unit 33 is used in processing performed by the processor 32 or the like. The output unit 34 outputs various kinds of information to the user. The network I/F 35 communicates with external apparatuses via the management network 7.

The HBA 36 is a communication device to be coupled to the volume 11 of the storage system 1 via the storage network 6. While the example shown in FIG. 2 features two HBAs 36, there may be one HBA 36 or three or more HBAs 36. In addition, each HBA 36 has a RAW device 361 that transmits an I/O request issued by the application program 312 to the storage system 1.

Figure 3:
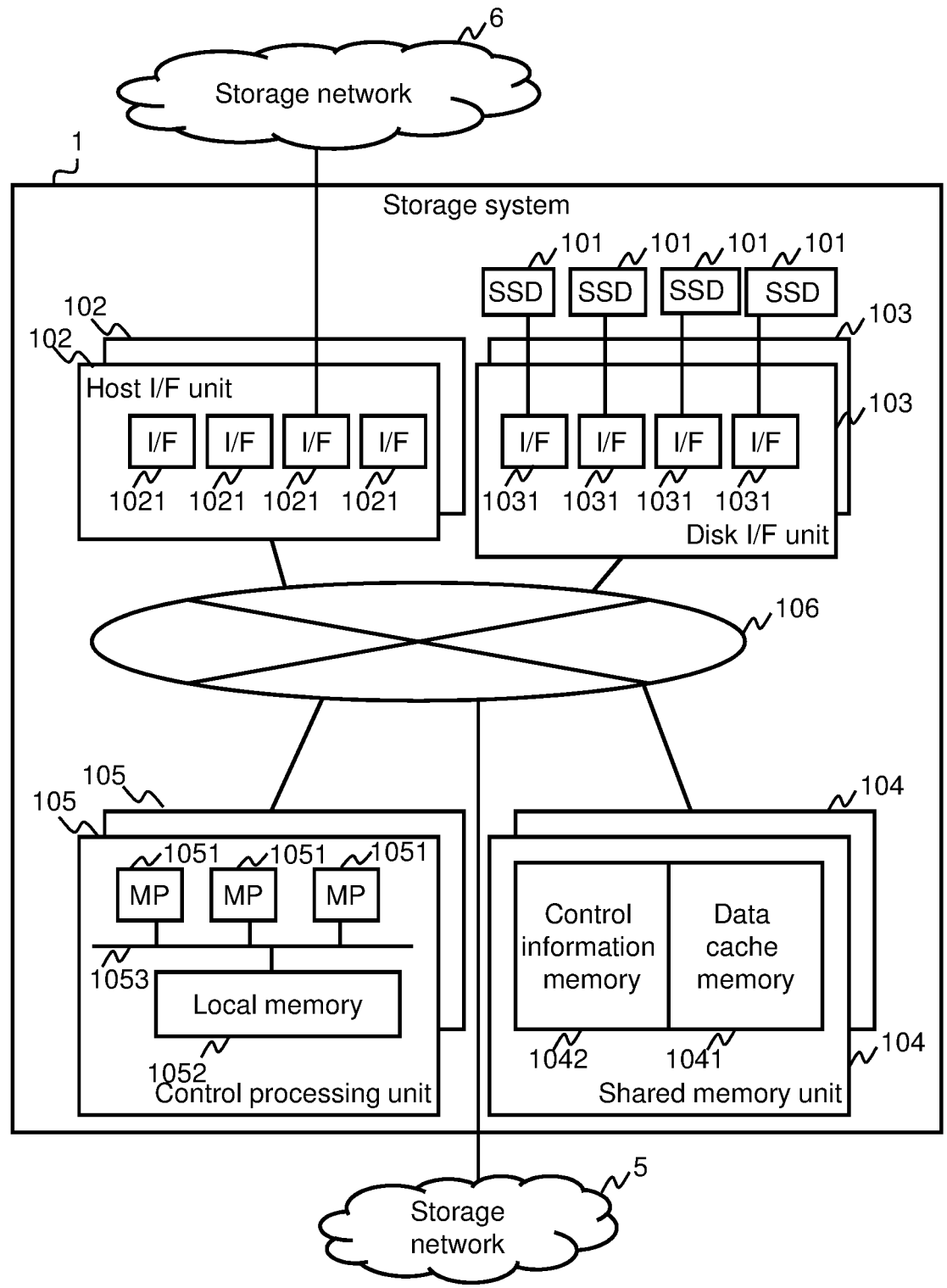
FIG. 3 is a diagram showing an example of a hardware configuration of a storage system.

FIG. 3 is a diagram showing an example of a hardware configuration of the storage system 1. The storage system 1 shown in FIG. 3 has the SSD 101, a host I/F unit 102, a disk I/F unit 103, a shared memory unit 104, and a control processing unit 105. The host I/F unit 102, the disk I/F unit 103, the shared memory unit 104, and the control processing unit 105 are coupled via an internal network 106 to be capable of communicating with each other.

The SSD 101 is a disk for storing data and functions as an internal storage apparatus that stores data to be a target of an I/O request from the host computer 3. The internal storage apparatus is not limited to the SSD 101 and may be a storage apparatus of another type such as an HDD (Hard Disk Drive). The SSD 101 may be provided in plurality.

The host I/F unit 102 is a host-side input/output unit having a plurality of I/Fs 1021 that are coupled so as to be capable of communicating with the host computer 3 and an example thereof is a FEPK (Front End Package). For example, the I/Fs 1021 accept an I/O request from the host computer 3 and output a result of the I/O request to the host computer 3.

The disk I/F unit 103 is a disk-side input/output unit having a plurality of I/Fs 1031 that are coupled so as to be capable of communicating with the SSD 101 and an example thereof is a BEPK (Back End Package). For example, each I/F 1031 is coupled to the SSD 101 via a cable and to the internal network 106 and mediates transfer processing of data that is a read and write target between the internal network 106 and the disk I/F unit 103.

The shared memory unit 104 is a temporary storage unit for storing data and information on a temporary basis and is, for example, a CMPK (Cache Memory Package). The shared memory unit 104 has a data cache memory 1041 and a control information memory 1042. The data cache memory 1041 and the control information memory 1042 are, for example, a volatile memory such as a DRAM (Dynamic Random Access Memory).

The data cache memory 1041 temporarily stores (caches) data to be written to the SSD 101 and temporarily stores data read from the SSD 101. The control information memory 1042 stores control information required by various types of processing to be performed by the storage system 1 and stores programs for executing the various types of processing to be performed by the storage system 1.

The control processing unit 105 controls the entire storage system 1 by cooperating with the host I/F unit 102, the disk I/F unit 103, and the shared memory unit 104 and an example thereof is an MPPK (Micro Processor Package). The control processing unit 105 has a plurality of MPs (Micro Processors) 1051, a local memory (LM) 1052, and a bus 1053 that couples each MP 1051 and the local memory 1052 so as to be capable of communicating with each other. The MP 1051 performs processing in accordance with an I/O request received by the host I/F unit 102. The local memory 1052 stores a portion required by the control processing unit 105 among control information stored in the control information memory 1042 and programs to be executed by the MP 1051 among programs stored in the control information memory 1042.

The host I/F unit 102, the disk I/F unit 103, the shared memory unit 104, and the control processing unit 105 shown in FIG. 3 constitute the storage controller 17 shown in FIG. 1. In addition, while the host I/F unit 102, the disk I/F unit 103, the shared memory unit 104, and the control processing unit 105 have been respectively duplexed in the example shown in FIG. 3 in order to improve reliability by creating a replica of data to be read and written, alternatively, the host I/F unit 102, the disk I/F unit 103, the shared memory unit 104, and the control processing unit 105 may not be duplexed or may be multiplexed three times or more.

Figure 4:
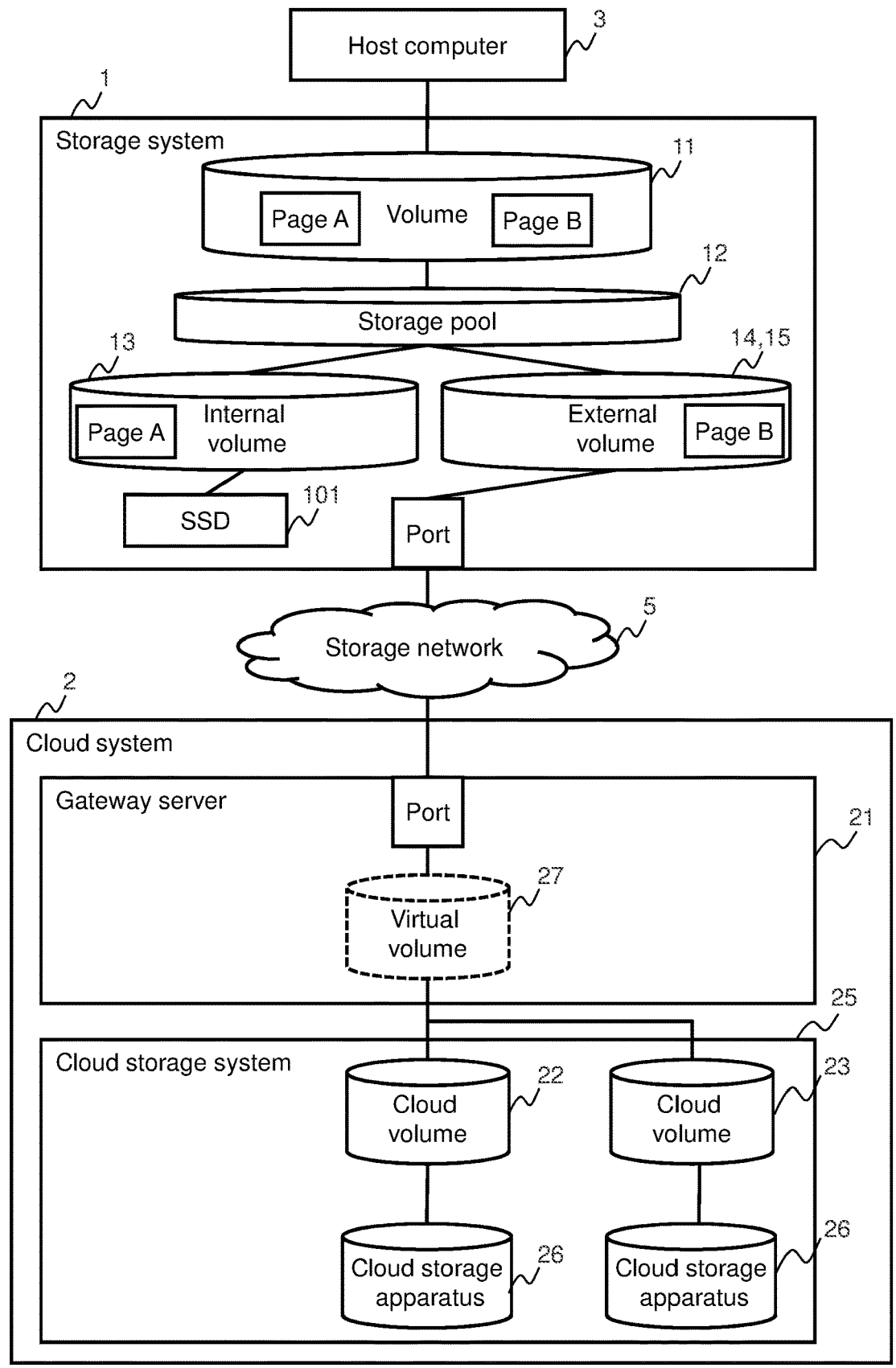
FIG. 4 is a diagram showing a volume configuration in a computer system.

FIG. 4 is a diagram showing a volume configuration in the computer system according to the present embodiment. The storage system 1 has the storage pool 12 that is constituted of the internal volume 13 and the external volumes 14 and 15 and provides the host computer 3 with the volume 11 having been segmented from the storage pool 12. The volume 11 is managed in a unit referred to as a page. In the example shown in FIG. 4, the volume 11 has two pages A and B in which the page A corresponds to the internal volume 13 and the page B corresponds to the external volume 14 or 15.

The internal volume 13 is allocated to the storage area of the SSD 101 and the external volumes 14 and 15 are allocated to the storage area of the cloud storage apparatus 26 that is an external storage apparatus provided in the cloud system 2.

The cloud system 2 has the gateway server 21 and a cloud storage system 25. The cloud storage system 25 has the cloud storage apparatus 26 and the cloud volumes 22 and 23 that are allocated to the storage area of the cloud storage apparatus 26. The cloud volumes 22 and 23 are provided to the storage system 1 by being virtualized as a virtual volume 27 in the gateway server 21. Specifically, the external volumes 14 and 15 of the storage system 1 are allocated to the storage area of the cloud storage apparatus 26 via the virtual volume 27 and the cloud volumes 22 and 23. As described above, a plurality of types of the cloud storage apparatus 26 are provided and the various types of the cloud storage apparatuses 26 have different access performances.

Figure 5:
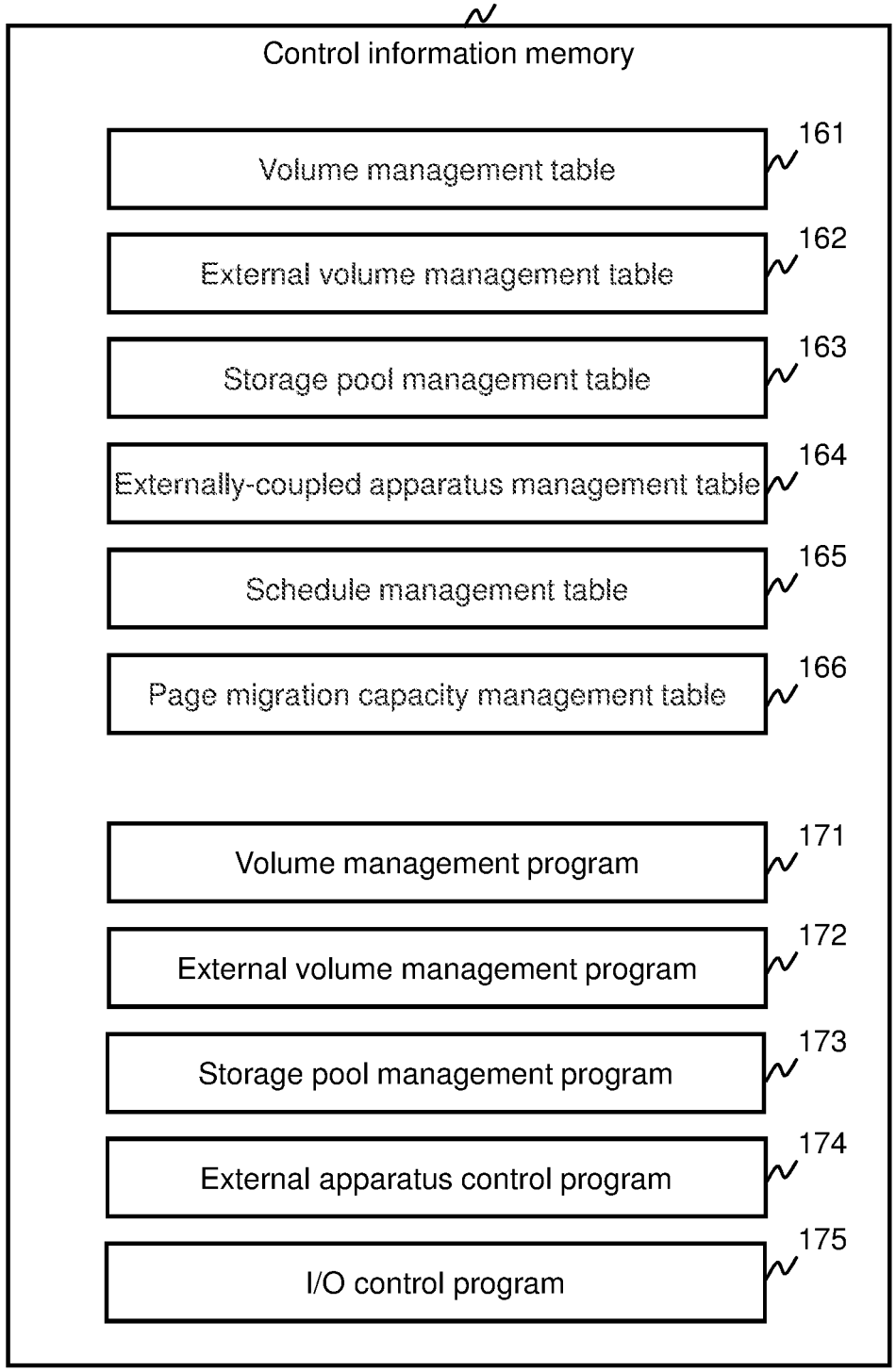
FIG. 5 is a diagram showing an example of control information and programs.

FIG. 5 is a diagram showing an example of control information and programs stored in the control information memory 1042. As shown in FIG. 5, the control information memory 1042 stores, as control information, the volume management table 161, the external volume management table 162, the storage pool management table 163, the externally-coupled apparatus management table 164, the schedule management table 165, and the page migration capacity management table 166.

FIG. 6 is a diagram showing an example of the volume management table 161. The volume management table 161 is information for managing the respective volumes (the volume 11, the internal volume 13, and the external volumes 14 and 15) of the storage system 1 and has fields 1611 to 1616.

The field 1611 stores a volume ID (VOL ID) that is identification information for identifying a volume. The field 1612 stores a capacity of the volume. The field 1613 stores a free capacity of the volume. The field 1614 stores a type (TYPE) of the volume. In this case, a type "DP-VVOL" indicates that the volume is the volume 11, a type "NORMAL" indicates that the volume is the internal volume 13, and a type "EXTERNAL" indicates that the volume is the external volumes 14 and 15. The field 1615 stores an affiliated storage medium indicating a storage apparatus that corresponds to the volume. In this case, the storage pool 12 is described as the affiliated storage medium of the volume 11. The field 1616 stores an allocation destination of the volume. The allocation destination of the volume 11 is the host computer 3 while the allocation destination of the internal volume 13 and the external volumes 14 and 15 is the storage pool 12.

FIG. 7 is a diagram showing an example of the external volume management table 162. The external volume management table 162 is information for managing the external volumes 14 and 15 and has fields 1621 to 1628.

The field 1621 stores a volume ID that is identification information for identifying the external volumes 14 and 15. The field 1622 stores a capacity of the external volumes 14 and 15. The field 1623 stores an external port ID (EXTERNAL PORT ID) that is identification information for identifying a port to which the external volumes 14 and 15 are to be coupled. The field 1624 stores an external group ID (EXTERNAL GROUP ID) that is identification information for identifying an external group to which the external volumes 14 and 15 belong.

The field 1625 stores a coupling destination volume ID (coupling destination VOL ID) that is identification information for identifying the cloud volumes 22 and 23 that are associated with the external volumes 14 and 15. The field 1626 stores a coupling destination apparatus ID that is identification information for identifying the cloud system 2 that includes the cloud volumes 22 and 23. The field 1627 stores a coupling destination affiliated tier that is a tier (an external tier) of the cloud volumes 22 and 23. The coupling destination affiliated tier indicates either "HOT" or "COLD". The field 1628 stores an external volume performance indicating an access performance that is required of the external volumes 14 and 15. While the external volume performance is indicated using IOPS (Input/Output Per Second) in the example shown in FIG. 7, another index may be used instead.

FIG. 8 is a diagram showing an example of the storage pool management table 163. The storage pool management table 163 is information for managing the storage pool 12 and has fields 1631 to 1636.

The field 1631 stores a pool ID (Pool ID) that is identification information for identifying the storage pool 12. The field 1632 stores a virtual capacity of the storage pool 12. The field 1633 stores an actual capacity of the storage pool 12. The field 1634 stores a type of the storage pool 12.

The fields 1635 and 1636 are provided for each tier that constitutes the storage pool 12. The field 1635 stores an allocated capacity that is a capacity of a target tier and the field 1636 stores an allocated volume (VOL) ID that is identification information for identifying an allocated volume being allocated to the target tier. In the example shown in FIG. 8, the allocated capacity and the allocated volume ID of the tier "Tier 1" are indicated as a T1 capacity and a T1 allocated volume ID, the allocated capacity and the allocated volume ID of the tier "Tier 2" are indicated as a T2 capacity and a T2 allocated volume ID, and the allocated capacity and the allocated volume ID of the tier "Tier 3" are indicated as a T3 capacity and a T3 allocated volume ID.

FIG. 9 is a diagram showing an example of the externally-coupled apparatus management table 164. The externally-coupled apparatus management table 164 is information for managing the cloud system 2 and has fields 1641 to 1644.

The field 1641 stores an apparatus ID that is identification information for identifying the cloud system 2. The field 1642 stores a management port to be coupled to the cloud system 2. The field 1643 stores tier information indicating an external tier that is a tier to be managed by the cloud system 2. In the present embodiment, the external tier is "HOT" and "COLD". The field 1644 stores an I/O performance requirement that indicates an access performance of the external tier. Specifically, the field 1644 includes fields 1644A and 1644B, the field 1644A stores an I/O pattern (IO PATTERN) indicating a type of an I/O request that can be received by the cloud volumes 22 and 23 that belong to the external tier, and the field 1644B stores IOPS.

FIG. 10 is a diagram showing an example of the schedule management table 165. The schedule management table 165 is information for managing an issuance schedule of control I/O requests that are I/O requests for tier control and has fields 1651 to 1657.

The field 1651 stores a volume ID of the external volumes 14 and 15. The field 1652 stores an I/O pattern indicating a type of an I/O request that can be received by the external volumes 14 and 15. The field 1653 stores IOPS as a required access performance indicating an access performance that is required of the external volumes 14 and 15. The field 1654 stores target area information indicating a target area that is a storage area of an access target of a control I/O request. For example, the target area information is LBA (Logical Block Addressing) of the target area.

The field 1655 stores an I/O issuance date/time that is a latest date and time at which a control I/O request had been issued to the external volumes 14 and 15. The field 1656 stores a repetition interval that is a time interval at which I/O requests for tier control are to be issued. The repetition interval is determined in accordance with a control condition of automatic tier control in the cloud system 2. The control condition is a predetermined condition related to a state of utilization of the cloud volumes 22 and 23 and an example thereof is to lower a tier of a cloud volume (change to a tier with lower access performance) when there is no access (no I/O request is issued) for a predetermined period to the cloud volumes 22 and 23. In this case, the repetition interval is a shorter period than the predetermined period. In the present embodiment, the repetition interval is set to 1 day.

The field 1657 stores a status (Status) of an external volume. Statuses of an external volume include a normal status (NORMAL) in which an actual access performance (tier) of the external volume matches an external volume performance, a warning status (WARNING) in which the actual access performance is lower than the external volume performance, and a notice state (NOTICE) in which the actual access performance is higher than the external volume performance.

FIG. 11 is a diagram showing an example of the page migration capacity management table 166. The page migration capacity management table 166 is information for managing tiers of a cloud volume associated with the external volumes 14 and 15 and has fields 1661 to 1665.

The field 1661 stores an entry number (entry #) that is identification information for identifying a migration target. The field 1662 stores a migration source tier that is an external tier corresponding to an external volume being the migration target (a target of which an external tier is to be changed). The field 1663 stores a migration destination tier that is a tier after a migration of an external volume being the migration target. The field 1664 stores a migration capacity that is a capacity of the external target volume being the migration target. The field 1665 stores a free capacity of the tier being a migration destination.

Let us now return to the description of FIG. 5. The control information memory 1042 stores, as programs, a volume management program 171, an external volume management program 172, a storage pool management program 173, an external apparatus control program 174, and an I/O control program 175. The volume management program 171, the external volume management program 172, the storage pool management program 173, the external apparatus control program 174, and the I/O control program 175 are, respectively, programs for realizing the volume managing unit 201, the external volume managing unit 202, the storage pool managing unit 203, the external apparatus control unit 204, and the I/O control unit 205 shown in FIG. 1.

Due to cooperation of the respective units 201 to 205, the storage controller 17 executes external tier control processing in which a tier to which the cloud volumes 22 and 23 associated with the external volumes 14 and 15 belong is controlled. Specifically, by adjusting a state of utilization of the external volumes 14 and 15, the storage controller 17 controls a tier to which the cloud volumes 22 and 23 associated with the external volumes 14 and 15 belong.

In addition, when an access performance of a tier to which the cloud volumes 22 and 23 belong does not match an external volume performance that is a predetermined access performance, the storage controller 17 may perform tier allocation status warning processing for notifying a warning message screen to that effect. Furthermore, when the access performance of the cloud volumes 22 and 23 does not satisfy the external volume performance, the storage controller 17 may perform tier adjustment processing for associating a cloud volume having been associated with the external volume to another cloud volume belonging to an external tier of which an access performance satisfies the external volume performance.

Hereinafter, processing to be performed by the storage controller 17 will be described in greater detail.

First, processing related to external tier control processing will be explained with reference to FIGS. 12 and 13.

Figure 12:
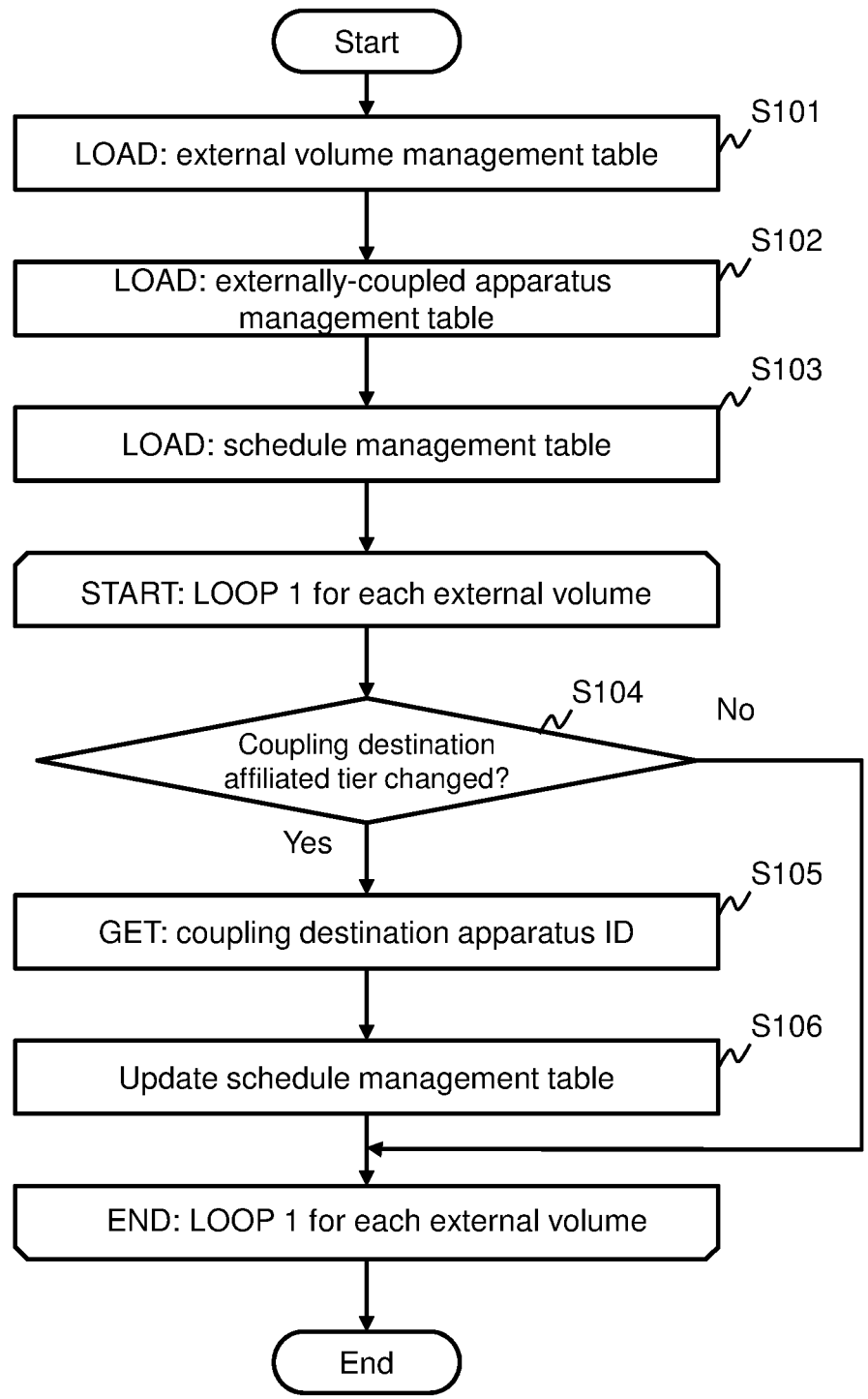
FIG. 12 is a flow chart for explaining an example of tier control I/O formulation processing.

FIG. 12 is a flow chart for explaining an example of tier control I/O formulation processing by the external volume managing unit 202.

In the tier control I/O formulation processing, first, the external volume managing unit 202 loads the external volume management table 162 from the control information memory 1042 (step S101). In addition, the external volume managing unit 202 loads the externally-coupled apparatus management table 164 from the control information memory 1042 (step S102). Furthermore, the external volume managing unit 202 loads the schedule management table 165 from the control information memory 1042 (step S103).

In addition, for each external volume identified by a volume ID included in the external volume management table 162, the external volume managing unit 202 executes loop processing LOOP 1 in which processing of steps S104 to S106 is repeated.

In the loop processing LOOP 1, the external volume managing unit 202 determines whether or not a coupling destination affiliated tier that is an external tier to which the external volume belongs has been changed (step S104). For example, the storage system 1 changes a coupling destination affiliated tier of the external volumes 14 and 15 according to a change request for changing the coupling destination affiliated tier via the storage management GUI 41 of the management apparatus 4 from the user, and the external volume managing unit 202 determines whether or not the coupling destination affiliated tier has been changed by monitoring change requests.

When the coupling destination affiliated tier has been changed, the external volume managing unit 202 acquires a coupling destination apparatus ID that is associated with the volume ID of the external volume from the external volume management table 162 (step S105). In addition, the external volume managing unit 202 acquires an I/O performance requirement that corresponds to a same apparatus ID as the acquired coupling destination apparatus ID from the externally-coupled apparatus management table 164 of the control information memory 1042 and updates the schedule management table 165 based on the I/O performance requirement (step S106).

On the other hand, when the affiliated tier has not been changed, the external volume managing unit 202 skips the processing of steps S105 and S106.

Once the processing of steps S104 to S106 is performed with respect to all external volumes, the external volume managing unit 202 ends the loop processing LOOP 1 and ends the tier control I/O formulation processing.

Figure 13:
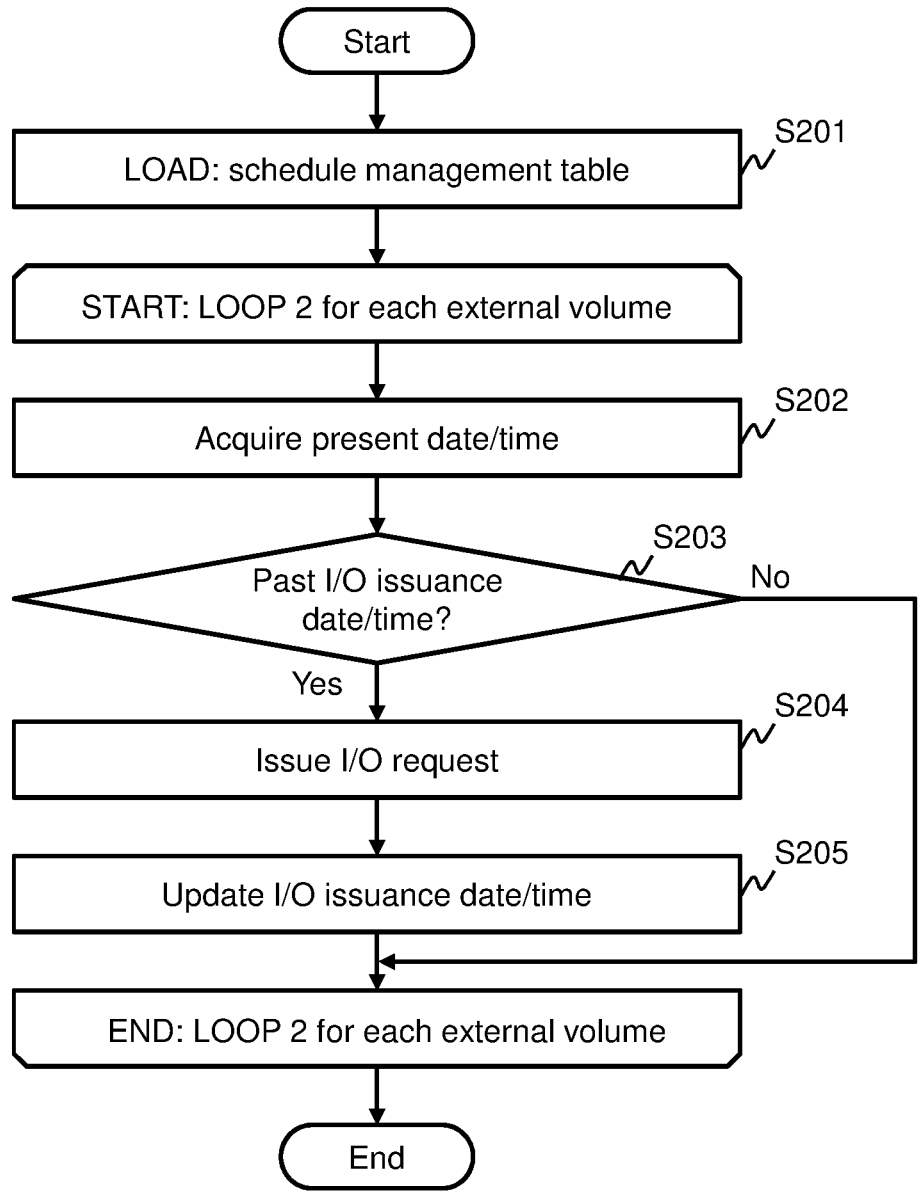
FIG. 13 is a flow chart for explaining an example of tier control processing.

FIG. 13 is a flow chart for explaining an example of tier control processing by the external apparatus control unit 204.

In the tier control processing, first, the external apparatus control unit 204 loads the schedule management table 165 from the control information memory 1042 (step S201).

In addition, for each external volume identified by a volume ID included in the schedule management table 165, the external apparatus control unit 204 executes loop processing LOOP 2 in which processing of steps S202 to S205 is repeated.

In the loop processing LOOP 2, the external apparatus control unit 204 acquires a present time point (step S202) and determines whether or not the present date/time is past an I/O issuance date/time that corresponds to the volume ID of the external volume in the schedule management table 165 (step S203).

When the present date/time is past the I/O issuance date/time, the external apparatus control unit 204 issues a control I/O request that is an I/O request for tier control to the external volume (step S204). In the present embodiment, the control I/O request is a write request with respect to a target area that corresponds to the volume ID of the external volume. For example, the target area is an area for storing management information that differs from data.

In addition, the external apparatus control unit 204 updates the I/O issuance date/time that corresponds to the volume ID of the external volume in the schedule management table 165 after an elapse of a repetition interval corresponding to the volume ID from the present time point (step S205).

When the present date/time has not passed the I/O issuance date/time, the external apparatus control unit 204 skips the processing of steps S204 and S205.

In addition, once the processing of steps S202 to S205 is performed with respect to all external volumes, the external apparatus control unit 204 ends the loop processing LOOP 2, and then ends the tier control processing.

Next, tier allocation status warning processing will be explained with reference to FIGS. 14 and 15.

Figure 14:
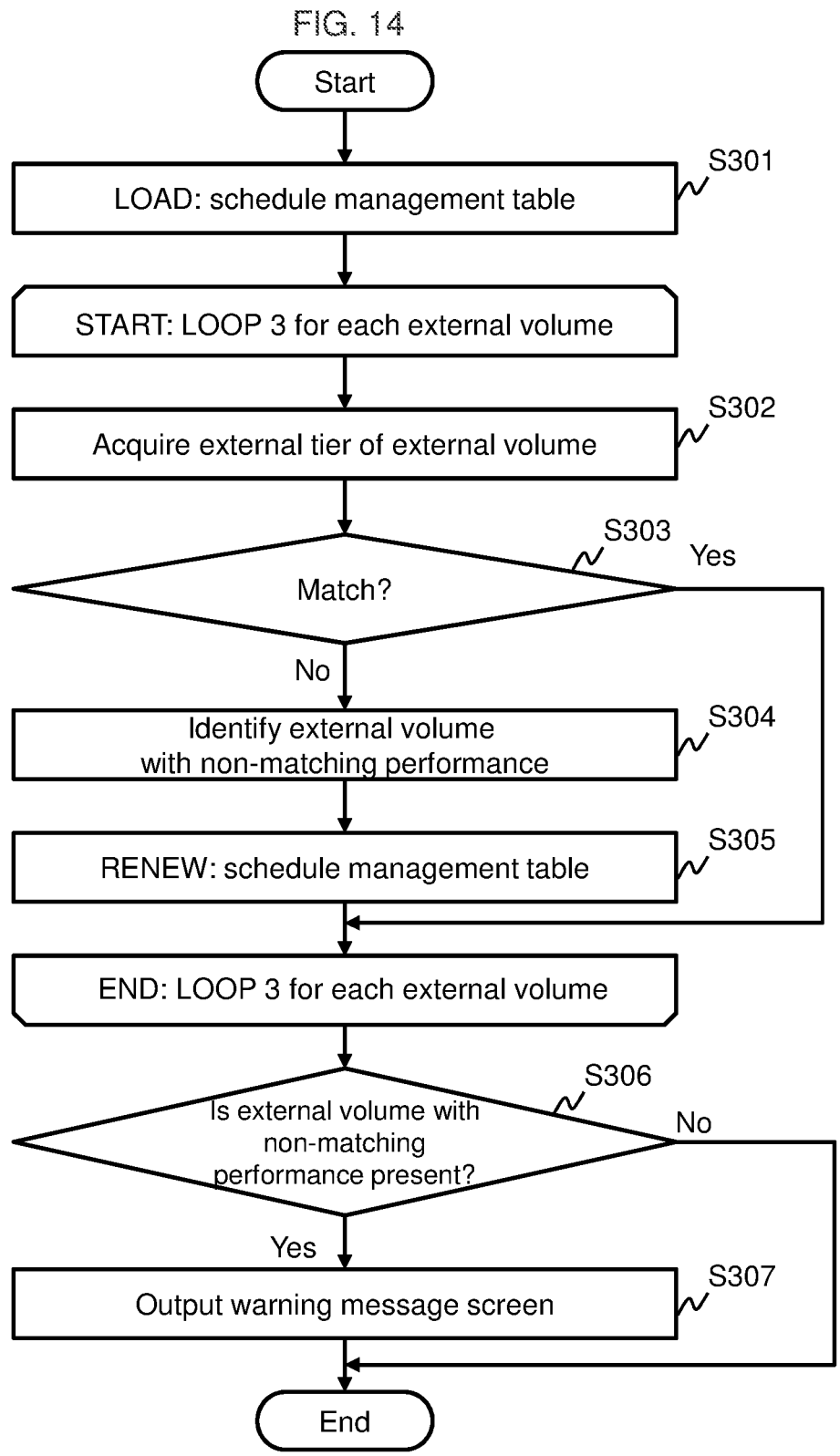
FIG. 14 is a flow chart for explaining an example of tier allocation status warning processing.

FIG. 14 is a flow chart for explaining an example of tier allocation status warning processing by the external apparatus control unit 204.

In the tier allocation status warning processing, first, the external apparatus control unit 204 loads the schedule management table 165 from the control information memory 1042 (step S301).

In addition, for each external volume identified by a volume ID included in the schedule management table 165, the external apparatus control unit 204 executes loop processing LOOP 3 in which processing of steps S302 to S305 is repeated.

In loop processing LOOP 3, the external apparatus control unit 204 acquires a coupling destination apparatus ID associated with the volume ID of the external volume from the external volume management table 162 and acquires a coupling destination tier that is a tier of a cloud volume corresponding to the external volume from the cloud control unit 24 of the cloud system 2 with the coupling destination apparatus ID (step S302).

The external apparatus control unit 204 acquires an I/O performance requirement associated with a same apparatus ID as the coupling destination apparatus ID and with tier information indicating a coupling destination tier from the externally-coupled apparatus management table 164. In addition, the external apparatus control unit 204 acquires an external volume performance that is associated with the volume ID of the external volume from the external volume management table 162. Furthermore, the external apparatus control unit 204 determines whether or not the I/O performance requirement matches the external volume performance (step S303).

When the I/O performance requirement does not match the external volume performance, the external apparatus control unit 204 identifies the external volume as an external volume with non-matching performance (step S304). In addition, the external apparatus control unit 204 updates the schedule management table 165 (step S305). For example, the external apparatus control unit 204 updates a status that is associated with the volume ID of the external volume in the schedule management table 165 to "WARNING" or "NOTICE".

On the other hand, when the I/O performance requirement matches the external volume performance, the external apparatus control unit 204 skips the processing of steps S304 and S305.

Once the processing of steps S302 to S305 is performed with respect to all external volumes, the external apparatus control unit 204 ends the loop processing LOOP 3 and determines whether or not an external volume with non-matching performance is present (step S306). For example, when an external volume of which a status is "WARNING" is present in the schedule management table 165, the external apparatus control unit 204 determines that an external volume with non-matching performance is present.

When an external volume with non-matching performance is present, the external apparatus control unit 204 outputs a warning message screen (step S307) and ends the processing. On the other hand, when an external volume with non-matching performance is not present, the external apparatus control unit 204 skips the processing of step S307 and ends the processing as it is.

FIG. 15 is a diagram showing an example of a warning message screen. A warning message screen 1500 shown in FIG. 15 indicates, for each external volume, a name 1501 of the external volume, a pool allocated tier 1502 that is an internal tier to which the external volumes 14 and 15 belong, a coupling destination affiliated tier 1503 that is an external tier to which the external volumes 14 and 15 belong, a state 1504 of the external volumes 14 and 15, and an error message 1505 with respect to the external volumes 14 and 15.

Next, processing related to tier adjustment processing will be explained with reference to FIGS. 16 to 21.

Figure 16:
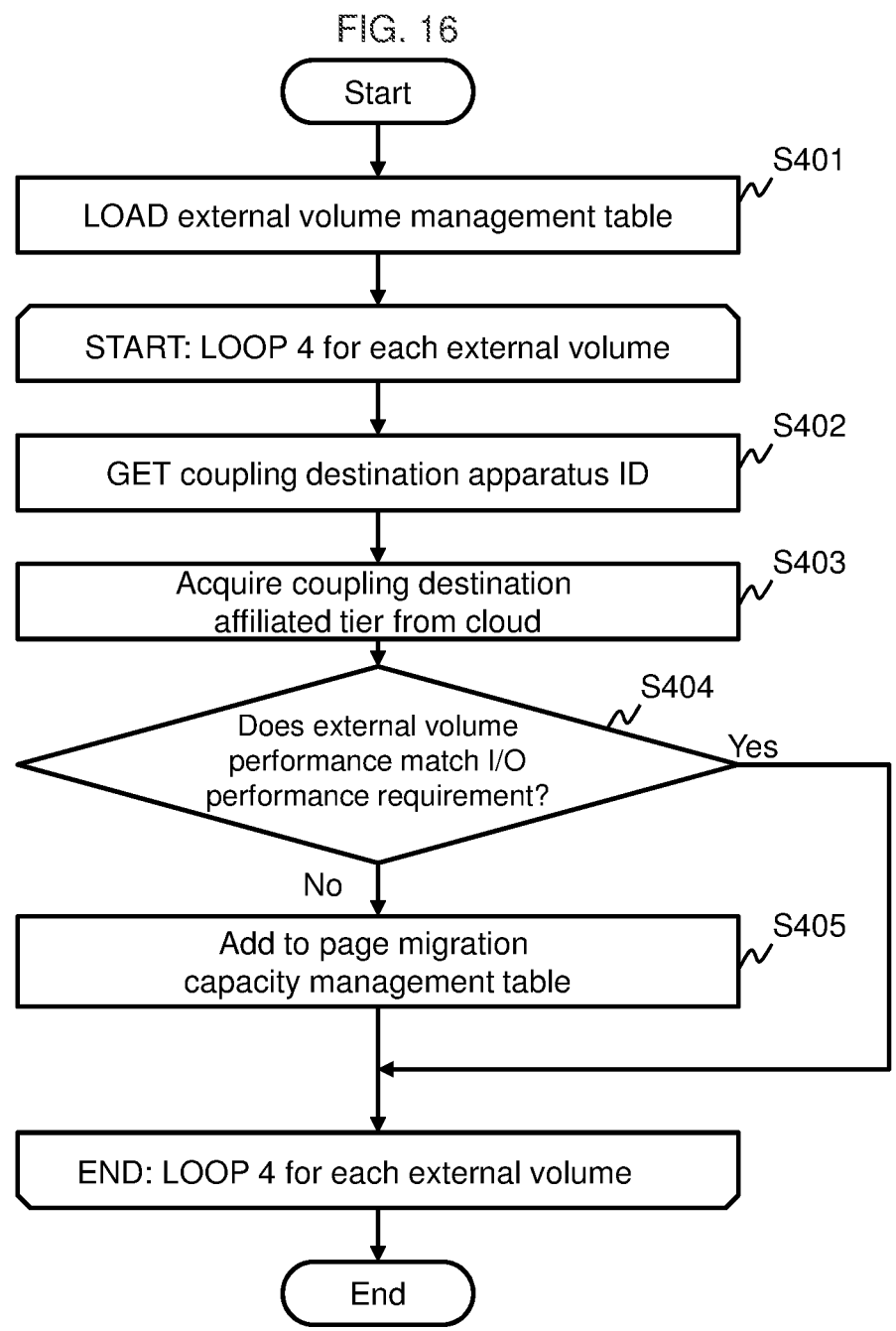
FIG. 16 is a flow chart for explaining an example of tier match determination processing.

FIG. 16 is a flow chart for explaining an example of tier match determination processing by the storage pool managing unit 203.

In the tier match determination processing, first, the storage pool managing unit 203 loads the external volume management table 162 from the control information memory 1042 (step S401).

In addition, for each external volume identified by a volume ID included in the external volume management table 162, the external apparatus control unit 204 executes loop processing LOOP 4 in which processing of steps S402 to S405 is repeated.

In loop processing LOOP 4, the external apparatus control unit 204 acquires a coupling destination apparatus ID that is associated with the volume ID of the external volume from the external volume management table 162 (step S402). The external apparatus control unit 204 acquires, as a coupling destination affiliated tier, an external tier of a cloud volume associated with the external volume from the cloud control unit 24 of the cloud system 2 with the coupling destination apparatus ID (step S403).

The external apparatus control unit 204 acquires an I/O performance requirement associated with a same apparatus ID as the coupling destination apparatus ID and with tier information indicating a coupling destination affiliated tier from the externally-coupled apparatus management table 164. In addition, the external apparatus control unit 204 acquires an external volume performance that is associated with the volume ID of the external volume from the external volume management table 162. Furthermore, the external apparatus control unit 204 determines whether or not the I/O performance requirement matches the external volume performance (step S404).

When the I/O performance requirement does not match the external volume performance, the external apparatus control unit 204 adds a record to the page migration capacity management table 166 (step S405). Specifically, the external apparatus control unit 204 adds a record having a present tier of the external volume as a migration source tier and a tier of which an I/O performance requirement matches the external volume performance as a migration destination tier to the page migration capacity management table 166. In regards to a migration capacity and a free capacity, for example, the external apparatus control unit 204 adds 0 as an initial value.

On the other hand, when the I/O performance requirement matches the external volume performance, the external apparatus control unit 204 skips step S405.

Once the processing of steps S402 to S405 is performed with respect to all external volumes, the external apparatus control unit 204 ends the loop processing LOOP 4 and ends the tier match determination processing.

Figure 17:
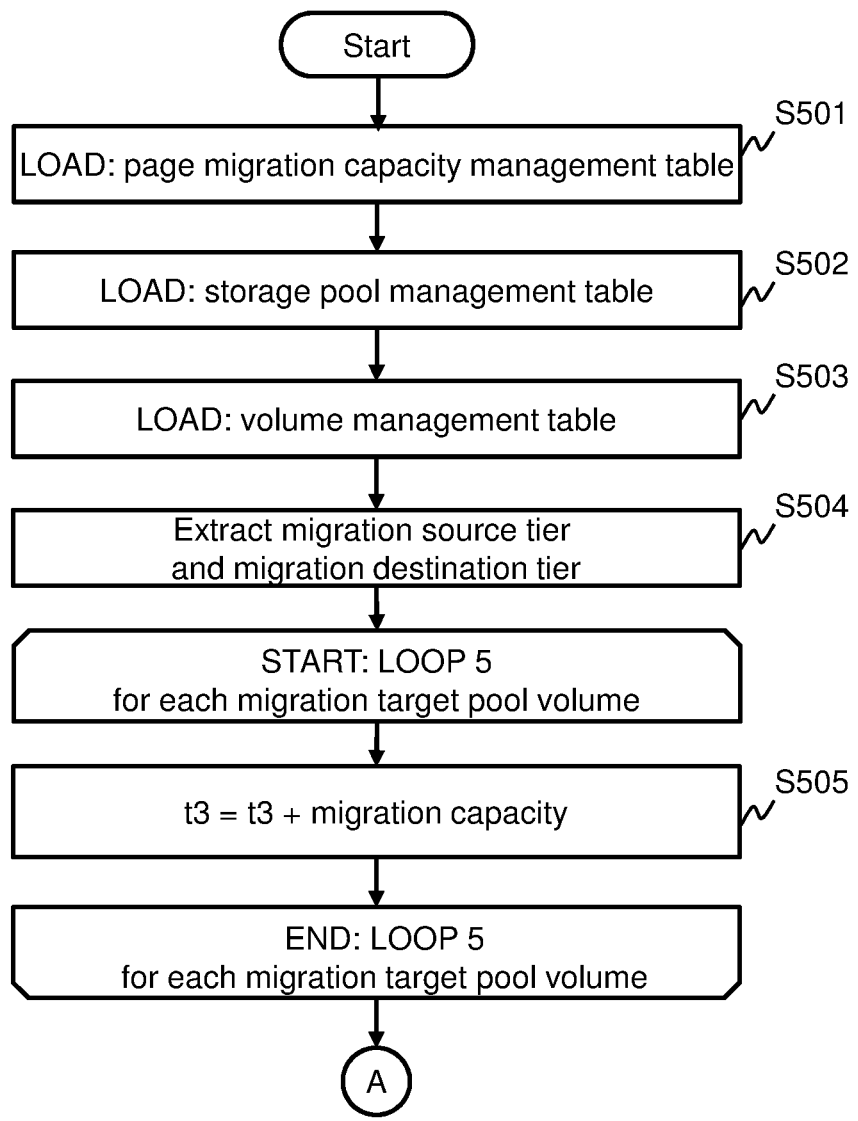
FIG. 17 is a flow chart for explaining an example of storage pool management processing.
Figure 18:
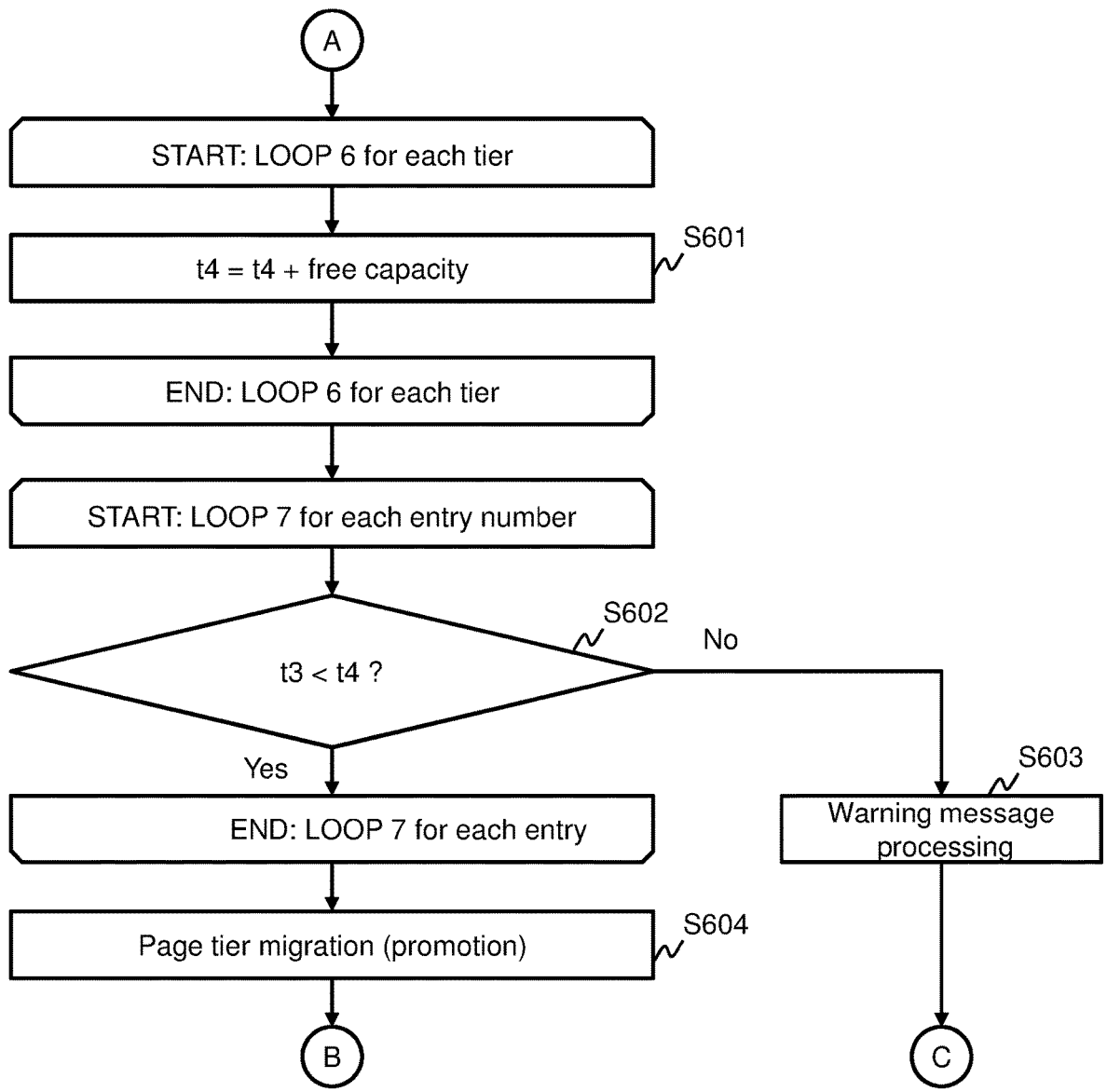
FIG. 18 is a flow chart for explaining an example of the storage pool management processing.
Figure 19:
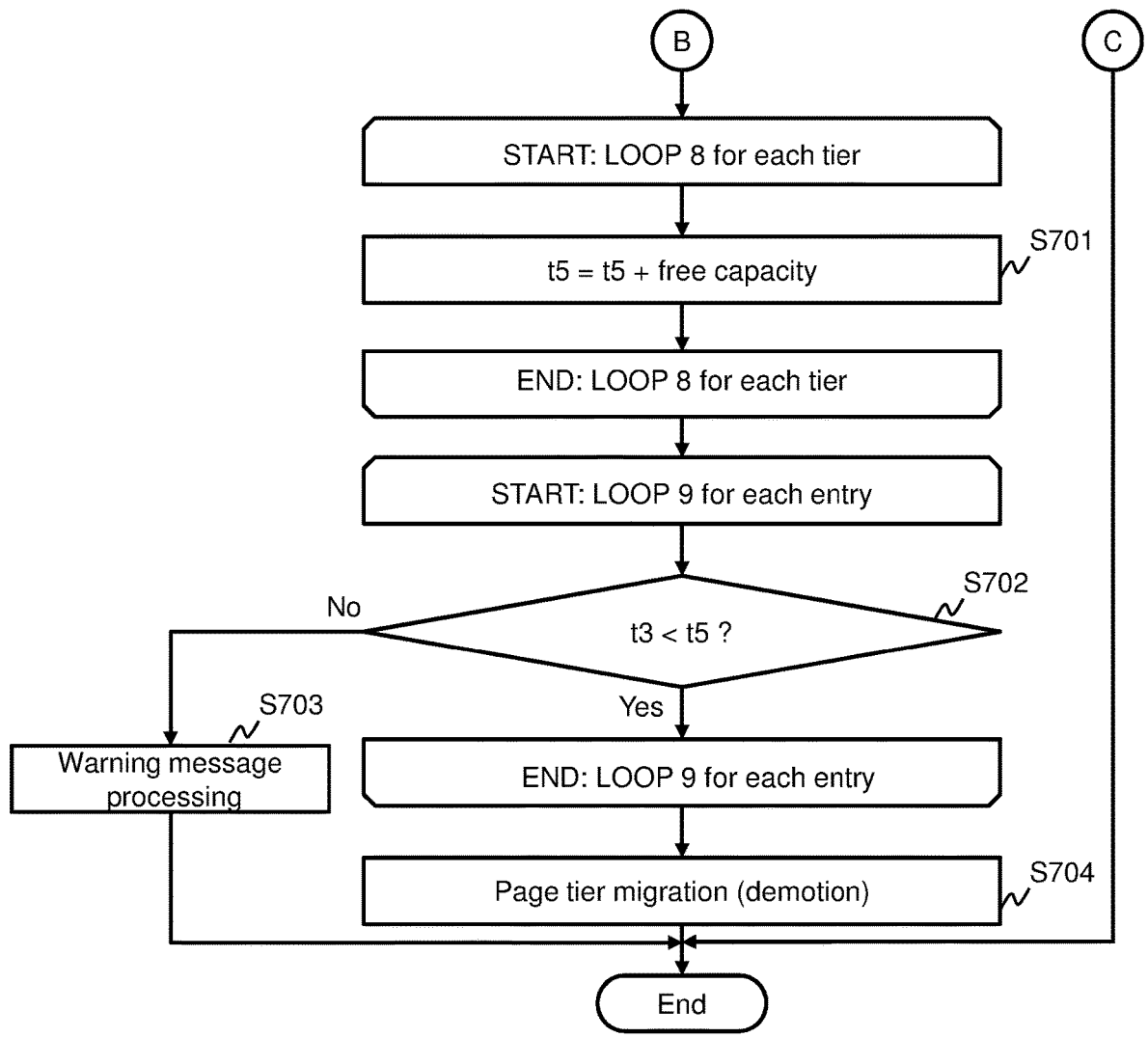
FIG. 19 is a flow chart for explaining another example of the storage pool management processing.

FIGS. 17 to 19 are flow charts for explaining an example of storage pool management processing by the storage pool managing unit 203. Specifically, FIG. 17 is a flow chart for explaining an example of page migration capacity calculation processing by the storage pool managing unit 203, FIG. 18 is a flow chart for explaining an example of promotion processing by the storage pool managing unit 203, and FIG. 19 is a flow chart for explaining an example of demotion processing by the storage pool managing unit 203. It should be noted that the page migration capacity calculation processing is executed when, for example, the storage pool management table 163 is updated.

In the page migration capacity calculation processing, first, the storage pool managing unit 203 loads the page migration capacity management table 166 from the control information memory 1042 (step S501). Next, the storage pool managing unit 203 loads the storage pool management table 163 from the control information memory 1042 (step S502). In addition, the storage pool managing unit 203 loads the volume management table 161 from the control information memory 1042 (step S503). The storage pool managing unit 203 acquires a migration source tier and a migration destination tier from the page migration capacity management table 166 (step S504).

In addition, for each migration target pool volume identified by an allocated volume ID of the migration source tier among allocated volume IDs included in the storage pool management table 163, the storage pool managing unit 203 executes loop processing LOOP 5 in which processing of step S505 is repeated.

In the loop processing LOOP 5, the storage pool managing unit 203 adds a capacity of the migration target pool volume to a migration capacity t3 of a record that includes a tier of the migration target pool volume in the page migration capacity management table 166 as a migration source tier (step S505).

Once the processing of step S505 is performed with respect to all migration target pool volumes, the storage pool managing unit 203 ends the loop processing LOOP 5 and migrates to the promotion processing shown in FIG. 18.

In the promotion processing, for each tier included in the storage pool management table 163, the storage pool managing unit 203 executes loop processing LOOP 6 in which processing of step S601 is repeated.

In the loop processing LOOP 6, the storage pool managing unit 203 calculates a free capacity that can be allocated to the tier (a free capacity of an allocated volume of the tier) and adds the calculated free capacity to a free capacity t4 of a record that includes the tier in the page migration capacity management table 166 as a migration destination tier (step S601).

Once the processing of step S601 is performed with respect to all tiers, the storage pool managing unit 203 ends the loop processing LOOP 6. Subsequently, for each entry number included in the page migration capacity management table 166, the storage pool managing unit 203 executes loop processing LOOP 7 in which processing of steps S602 to S603 is repeated.

In the loop processing LOOP 7, the storage pool managing unit 203 determines whether or not migration capacity t3<free capacity t4 is satisfied in the entry number (step S602). When migration capacity t3<free capacity t4 is not satisfied, the storage pool managing unit 203 outputs a warning message screen (step S603) and ends the processing.

Once the processing of steps S602 to S603 is performed with respect to all entry numbers, the storage pool managing unit 203 ends the loop processing LOOP 7. In addition, when step S603 is skipped, the storage pool managing unit 203 changes a tier of a promotion migration target pool volume of which an access performance in the page migration capacity management table 166 is higher with respect to a migration destination tier than a migration source tier among the migration target pool volume from the migration source tier to the migration destination tier (step S604) and migrates to demotion processing.

In the demotion processing, for each pool identified by a pool ID included in the storage pool management table 163, the storage pool managing unit 203 executes loop processing LOOP 8 in which processing of step S701 is repeated.

In the loop processing LOOP 8, since the free capacity of each allocated tier has changed in the promotion tier migration processing, the storage pool managing unit 203 once again calculates a free capacity that can be allocated to the tier and adds the calculated free capacity to a free capacity t5 of a record that includes the tier in the page migration capacity management table 166 as a migration destination tier (step S701).

Once the processing of step S701 is performed with respect to all tiers, the storage pool managing unit 203 ends the loop processing LOOP 8. Subsequently, for each entry number included in the page migration capacity management table 166, the storage pool managing unit 203 executes loop processing LOOP 9 in which processing of steps S702 to S703 is repeated.

In the loop processing LOOP 9, the storage pool managing unit 203 determines whether or not migration capacity t3<free capacity t5 is satisfied in the entry number (step S702). When migration capacity t3<free capacity t5 is not satisfied, the storage pool managing unit 203 outputs a warning message screen (step S703) and ends the processing.

Once the processing of steps S702 to S703 is performed with respect to all entry numbers, the storage pool managing unit 203 ends the loop processing LOOP 9. In addition, when step S703 is skipped, the storage pool managing unit 203 changes a tier of a demotion migration target pool volume of which an access performance in the page migration capacity management table 166 is lower with respect to a migration destination tier than a migration source tier among the migration target pool volume from the migration source tier to the migration destination tier (step S704) and ends the demotion processing.

FIG. 20 is a diagram showing an example of the warning message screen that is output in step S603. A warning message screen 2000 shown in FIG. 20 has a name 2001 of a storage pool, a tier 2002 of the storage pool, a total capacity 2003, a free capacity 2004, a migration capacity 2005, a state 2006, and a message 2007.

FIG. 21 is a diagram showing an example of the warning message screen that is output in step S703. A warning message screen 2100 shown in FIG. 21 has a name 2101 of a storage pool, a tier 2102 of the storage pool, a total capacity 2103, a free capacity 2104, a migration capacity 2105, a state 2106, and a message 2107.

As described above, according to the present embodiment, the storage system 1 is coupled to the cloud system 2 that provides cloud volumes 22 and 23 belonging to any of a plurality of tiers with different access performances. The cloud system 2 changes a tier to which an externally-provided volume belongs based on a state of volume utilization in which the cloud volumes 22 and 23 are utilized. The storage controller 17 of the storage system 1 provides the host computer 3 with the volume 11 created by allocating a page to an external volume corresponding to the cloud volumes 22 and 23. In addition, the storage controller 17 adjusts a state of volume utilization to control a tier to which the cloud volumes 22 and 23 belong. Therefore, desired service quality can be maintained even when automatic tier control with respect to an external storage apparatus is performed.

In addition, in the present embodiment, the storage controller 17 issues an access request to the cloud volumes 22 and 23 so that the state of volume utilization satisfies a predetermined utilization requirement. Therefore, since a change in a tier to which the cloud volumes 22 and 23 belong can be suppressed, desired service quality can be maintained.

Furthermore, in the present embodiment, since an access request is issued at a repetition interval in accordance with a utilization requirement, a change in a tier to which the cloud volumes 22 and 23 belong can be appropriately suppressed.

Moreover, in the present embodiment, since the access request is a write request with respect to a predetermined storage area in the cloud volumes 22 and 23, cost can be reduced when a fee is charged for every read request.

In addition, in the present embodiment, when a tier to which the cloud volumes 22 and 23 belong does not match a predetermined access performance, the storage controller 17 issues a notification to that effect. Therefore, a manager of the storage system 1 can take appropriate action when the tier to which the cloud volumes 22 and 23 belong does not have a predetermined access performance.

Furthermore, in the present embodiment, when a tier to which the cloud volumes 22 and 23 associated with an external volume belong does not match a predetermined access performance, the storage controller 17 associates the external volume with another externally-provided volume that has the predetermined access performance. Therefore, a change can be made to desired service quality.

The embodiment of the present disclosure described above merely represents an example for explaining the present disclosure, and it is to be understood that the scope of the present disclosure is not to be solely limited to the embodiment. It will be obvious to those skilled in the art that the present disclosure can be implemented in various other modes without departing from the scope of the present disclosure.

What is claimed is:

1. A storage system coupled to an external storage system that provides an externally-provided volume belonging to any of a plurality of tiers with different access performances, the external storage system changing a tier to which the externally-provided volume belongs based on a state of utilization of the externally-provided volume, the storage system comprising,
    a control unit which provides a host with a volume created by allocating a page to an external volume associated with the externally-provided volume and which controls the tier to which the externally-provided volume belongs by adjusting a state of utilization of the external volume.

2. The storage system according to claim 1, wherein the external storage system changes the tier to which the externally-provided volume belongs to a tier of which the access performance is low in a case where the state of utilization does not satisfy a predetermined condition, and
    the control unit issues an access request to the externally-provided volume so that the state of utilization satisfies the condition.

3. The storage system according to claim 2, wherein the control unit repetitively issues the access request at a time interval in accordance with the condition.

4. The storage system according to claim 2, wherein the access request is a write request with respect to a predetermined storage area in the externally-provided volume.

5. The storage system according to claim 1, wherein in a case where an access performance of the tier to which the externally-provided volume belongs does not match a predetermined access performance, the control unit issues a notification to that effect.

6. The storage system according to claim 1, wherein in a case where an access performance of the tier to which the externally-provided volume belongs does not match a predetermined access performance, the control unit associates the external volume with another externally-provided volume having the predetermined access performance.

7. The storage system according to claim 6, wherein in a case where a capacity of the external volume is equal to or larger than a free capacity that can be associated with the other externally-provided volume, the control unit associates the external volume with the other externally-provided volume, but in a case where the capacity of the external volume is smaller than the free capacity, the control unit issues a notification to that effect.

8. The storage system according to claim 1, wherein the external volume is coupled to the externally-provided volume so as to be capable of communicating with each other via a wide-area communication network and a gateway.

9. A control method of a storage system coupled to an external storage system that provides an externally-provided volume belonging to any of a plurality of tiers with different access performances, the external storage system changing a tier to which the externally-provided volume belongs based on a state of utilization of the externally-provided volume,
    the control method comprising: providing a host with a volume created by allocating a page an external volume and controlling the tier to which the externally-provided volume belongs by adjusting a state of utilization of the external volume.

* * * * *